Feb. 19, 1952 A. W. FRIEND ET AL 2,586,463

ELECTRON BEAM DEFLECTION SYSTEM

Filed July 7, 1950

Inventors
ALBERT W. FRIEND
& FREDERICK H. NICOLL
BY Olin Q. Mitchell
Attorney

Patented Feb. 19, 1952 2,586,463

UNITED STATES PATENT OFFICE 2,586,463

ELECTRON BEAM DEFLECTION SYSTEM

Albert W. Friend and Frederick H. Nicoll, Princeton, N. J., assignors to Radio Corporation of America, a corporation of Delaware Application July 7, 1950, Serial No. 172,514

7 Claims. (Cl. 313—76)

This invention relates to the art of electron beam deflection. It has particular reference to systems for deflecting an electron beam to scan a target electrode in successive traces having a high degree of linearity.

In many forms of cathode ray tubes it is desired to deflect an electron beam over a target electrode in a manner to produce substantially linear traces. One example of a tube of this character is a kinescope used in a television system. Another television tube of this character is a camera or pick up tube. While good linearity of electron beam deflection is greatly to be desired in black and white television systems, it is even more necessary in color television systems.

With most of the different types of cathode ray tubes presently used in color television systems, good color registration requires a high degree of linearity of electron beam deflection. This is particularly true in multi-color kinescopes in which the position of the electron beam relative to the components of the luminescent screen determines the color of the light produced by the screen.

A representative example of a multi-color kinescope in which a high degree of linearity of the electron beam deflection is required is a tube having a luminescent screen made up of a multiplicity of linear phosphor strips. These phosphor strips extend substantially from one side of the screen to the opposite side. Preferably, they are of sub-elemental widths. It is immaterial whether the strips extend vertically or horizontally. In a tube of this type the different phosphor screen strips are capable respectively of emitting light of the different component image colors. It, therefore, is necessary that a high degree of electron beam deflection linearity be maintained, at least in the direction in which the phosphor screen strips extend.

Accordingly, it is an object of the invention to provide an improved electron beam deflection and electron-optical system which is capable of producing a high degree of electron beam deflection linearity.

Another object of the invention is to provide an improved deflection yoke for the electron beam of a cathode ray tube by which to linearize the beam deflection through relatively wide angles.

In accordance with the present invention, there is provided a deflection yoke for the electron beam of a cathode ray tube having salient pole pieces. In one form of the invention, the horizontal and vertical yoke components are assembled so that they surround respectively two different regions spaced longitudinally along the path of the electron beam. Additionally, the salient pole pieces of one or both of the horizontal and vertical deflection yoke components are given particular shapes. By means of the shaping and relative placement of the salient pole pieces, there are produced electromagnetic fields which are of such a character that the resultant beam deflection has a high degree of linearity.

Deflection yokes presently used successfully with kinescopes operating in black and white television systems are not readily adaptable for use with multi-color kinescopes of the type having a line phosphor screen, for example. The chief reason for this is that these yokes tend to produce some distortion of the scanned raster. The most common raster distortion encountered is of the pin-cushion type. This type of distortion becomes more severe when the target electrode scanned by the beam has a substantially flat surface disposed substantially normal to the axis through the deflection system. A uniform magnetic deflection field will result in a pin-cushion distortion of the scanned raster on both the horizontal and vertical lines. In the case where the target electrode is provided with horizontal phosphor strips, it is necessary that the horizontal deflection of the beam remain exactly along a single phosphor strip during its entire movement from one side of the screen to the other. In order to accomplish this it is necessary that the vertical deflection of the beam be fixed for all horizontal deflection angles. Pin-cushion distortion results from the failure to fix the vertical deflection for all horizontal deflection angles.

It is recognized that conventional deflection yokes of the type presently used with kinescopes operating in black and white television systems, are susceptible of producing the type of magnetic deflecting field which will afford a high degree of beam deflection linearity. A typical yoke of this kind is provided with two pairs of superimposed coils. One pair is used for vertical deflection and one for horizontal. With such a yoke the magnetic field configuration is largely a function of the position of each wire in the coils. Therefore, where a high degree of accuracy of the magnetic field configuration is required, the placing of the wires in the coil windings becomes very critical. Such a device has no practical commercial value, chiefly for the reason that it is so difficult to manufacture such yokes with any semblance of uniformity.

A magnetic deflection field of the type required to maintain a high degree of linearity of electron beam deflection is provided by the structure embodying one form of the present invention. This structure specifically is of the type having salient pole pieces. The desired configuration of the magnetic field, however, is provided by this invention in the particular shapes given to the faces of the pole pieces.

In accordance with an additional feature of the invention, there is provided an electron-optical lens between the deflecting yoke and the target electrode to effect a refinement of the "pin-cushion" and/or "barrel" distortion. This feature is particularly useful in multi-color kinescopes.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3, 4, 5, 6, 7, 8, 9, 10:
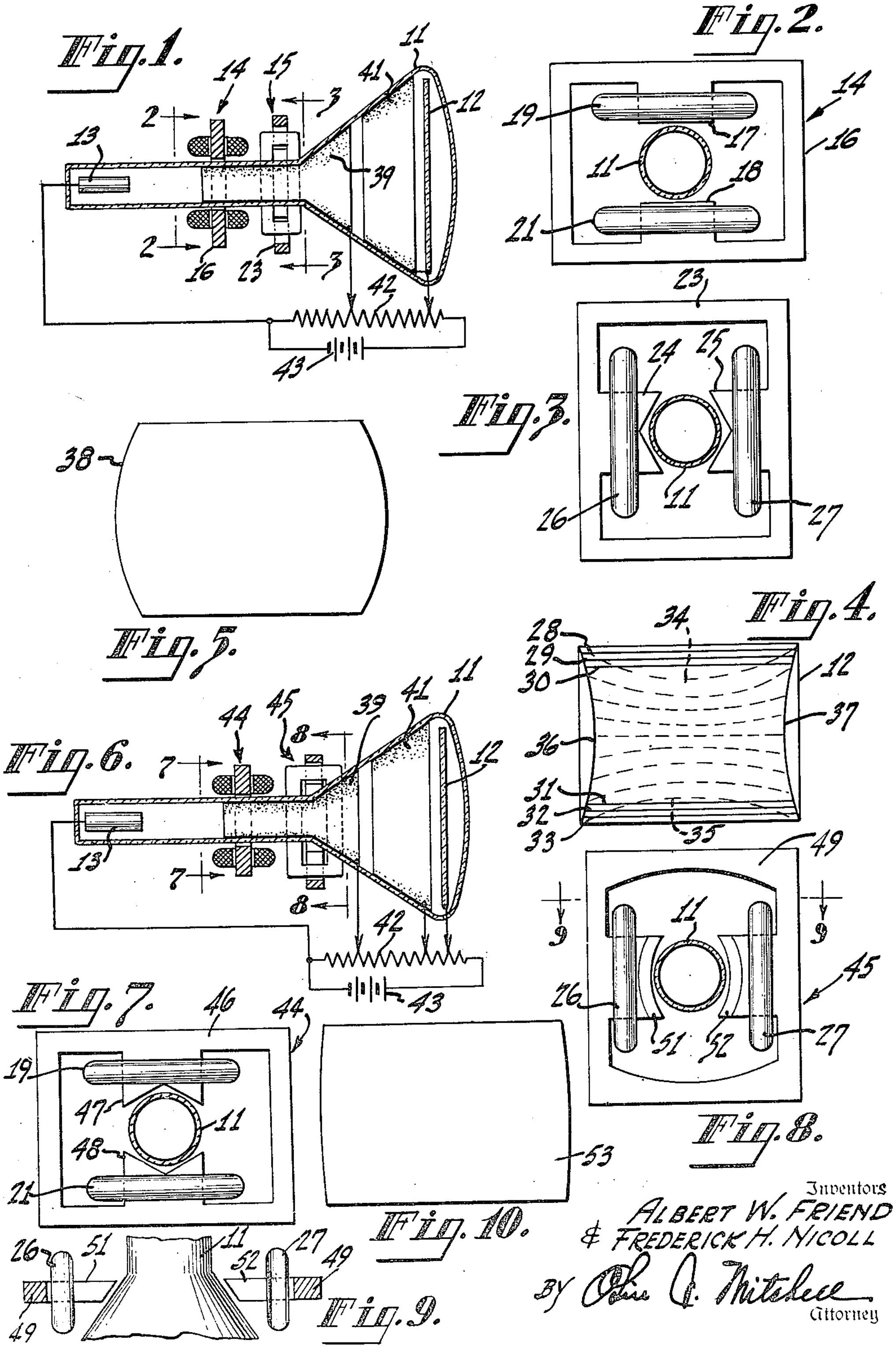
Figure 1 is a side view of a color kinescope embodying one form of the invention.
Figure 2 is a sectional view taken on the line 2—2 of Figure 1 and shows the general shape of the horizontal deflection yoke.
Figure 3 is a sectional view taken on the line 3—3 of Figure 1 and shows a representative form of vertical deflection yoke.
Figure 4 is a face view of a target electrode scanned by an electron beam and shows the kind of distortion encountered without the use of the present invention.
Figure 5 shows the general shape of the raster scanned by an electron beam using the form of the invention shown in Figures 1, 2 and 3.
Figure 6 is a side view of a kinescope provided with a deflection yoke assembly embodied in another form of the invention.
Figure 7 is a sectional view taken along the line 7—7 of Figure 6 and shows the shape of another form of horizontal deflection yoke.
Figure 8 is a sectional view taken along the line 8—8 of Figure 6 and shows the shape of the vertical deflection yoke in this form of the invention.
Figure 9 is another sectional view taken along the line 9—9 of Figure 8 and shows another view of the pole structure of the vertical deflection yoke.
Figure 10 shows the general shape of the raster scanned by an electron beam when the form of the invention shown in Figures 6, 7, 8 and 9 is used.

Reference first will be made to Figures 1, 2 and 3 illustrating one form of the invention. The deflection yoke and lens assembly is shown in conjunction with a cathode ray tube of the type especially designed for operation in a color television system. It will be understood that this type of cathode ray tube is merely illustrative of the type of apparatus with which the invention may be employed. Other kinescopes, for example, useful only in black and white television systems or even as oscilloscopes, may be improved in performance by means of the present invention. Also signal-generating television camera tubes such as iconoscopes, orthicons, image orthicons and similar types of cathode ray tubes also may be provided with deflection yokes and/or distortion-correcting lenses in accordance with the invention.

Accordingly, it will be understood that the cathode ray tube 11 is illustratively shown as a color kinescope. It is provided with a target electrode in the form of a substantially flat luminescent screen 12 which, in some cases, preferably has an electron-transparent metallic film. The screen may consist of a transparent base of glass, for example, upon the back face of which are disposed phosphor materials. The phosphors are of different kinds capable, respectively, of emitting light of the different component colors of the image to be reproduced when excited by an electron beam. The particular pattern in which the phosphors are arranged on the luminescent screen is immaterial so far as the broad aspects of the invention are concerned. In a particular case, the invention may be beneficially employed in conjunction with a luminescent screen in which the phosphors are arranged in elongated strips, each preferably of sub-elemental width. The different phosphor strips are arranged in groups, each of which includes one of each of the phosphors capable of emitting light of the different image colors.

The kinescope 11 also is provided with a conventional electron gun 13. The details of this structure have not been shown for the reason that they are not necessary for an understanding of the present invention. It will be understood that an electron beam is developed and directed in the usual manner toward the luminescent screen 12. The beam is deflected to scan a raster at the screen by apparatus which embodies the present invention.

Deflection of the electron beam in this case is effected by a deflection yoke assembly which includes individual horizontal and vertical yokes 14 and 15 disposed as indicated in Figure 1. The horizontal deflection yoke 14 is located farther from the screen 12 than the vertical deflection yoke 15. Accordingly, the electron beam is deflected first horizontally and later vertically to scan the desired raster at the screen 12.

The horizontal deflection yoke 14 consists essentially of a magnetic core 16 having a pair of vertically extending salient pole pieces 17 and 18. The pole pieces extend as shown in Figure 2 substantially to the outside wall of the neck of the kinescope 11. In this case it will be seen that the pole pieces 17 and 18 have substantially flat faces. Accordingly, the gap defined by these pole faces has a substantially unvarying width. The horizontal deflection yoke also is provided with energizing windings 19 and 21 mounted, respectively, on the salient pole pieces 17 and 18. The energization of these windings in the usual manner produces a field of substantially uniform instantaneous intensity in the gap between the pole pieces 17 and 18.

The vertical deflection yoke 15 also includes a magnetic core 23. The core is provided with a pair of horizontally extending salient pole pieces 24 and 25. In this case, it will be noted that the faces of the pole pieces 24 and 25 are shaped so as to define a gap therebetween which is wider at its center than at its ends. Energizing windings 26 and 27 are mounted respectively on the pole pieces 24 and 25. When these windings are energized in the usual manner, a field of non-uniform instantaneous intensity is produced as the result of the shape of the faces of the pole pieces. In this illustrative example, the faces of the pole pieces 24 and 25 are symmetrically shaped so that the gap defined thereby is of the same minimum width at its ends and a maximum width at its center. Accordingly, it is seen that the intensity of the vertical deflecting field is greater at the upper and lower extremities than at its central region. The faces of the pole pieces 24 and 25 are shaped to provide a substantially linear variation of the field intensity from the central region to each of the upper and lower portions.

In order to illustrate the beneficial results obtained by the use of a deflection system in accordance with this invention, reference now will be made to Figure 4. Only the general character of the luminescent screen 12 is indicated. For example, the horizontal phosphor strips 28, 29 and 30 disposed in the upper edge of the screen are capable of emitting light in red, green and blue colors, respectively. Similarly, the strips 31, 32 and 33 located at the lower extremity of the screen 12 emit red, green and blue light, respectively, when excited by an electron beam. It will be understood that these two groups of phosphor strips are merely typical of similar groups of strips extending throughout substantially the whole area of the screen 12.

The broken lines extending from left to right in this figure represent typical traces made by an electron beam as it is deflected in a conventional manner to scan a raster at the screen. The scanned raster is intended to be substantially rectangular. It will be noted that the uppermost trace 34 follows a path which is concave upwardly. A complementary path is followed by the lowermost trace 35. Only in the central region of the screen is the electron beam deflected substantially linearly as indicated.

This type of horizontal distortion is that which is commonly called "pin cushion." Furthermore, the raster scaned by the beam with a conventional deflection yoke may also have a vertical distortion which is of the "pin cushion" type. The latter is indicated by the lines 36 and 37 forming the locus of the beginning and ending points of the horizontal traces.

It is seen that the pin-cushion distortion of the horizontal excursions of the electron beam would render it impossible to selectively excite the different phosphor strips in accordance with received color television signals. It is imperative, therefore, that the horizontal traces be corrected for distortion of the character indicated. The correction necessary is to provide non-uniformity of the intensity of the vertical deflecting field. Midway between the left and right hand margins of the scanned raster it is seen that both of the horizontal traces 34 and 35 require more vertical deflection than at the extreme ends thereof. Accordingly, by shaping the faces of the salient poles 24 and 25 of the vertical deflection core 23 as shown in Figure 3, a practical approximation may be made of the required vertical deflecting field. It is seen that the maximum separation between the pole pieces 25 occurs substantially at the centers thereof. The gap defined by these pole pieces decreases in both directions from the center to a minimum dimension at the extreme edges.

It has been found that, by means of an embodiment of the invention such as illustrated in Figures 1, 2 and 3, it is possible to produce a scanned raster at the luminescent screen 12 having substantially the shape shown at 38 of Figure 5. It will be noted that the raster 38 has "barrel" type distortion in a vertical sense. However, so far as color selection is concerned, the horizontal linearity is considerably improved substantially as shown. The vertical distortion is not particularly objectionable from a color selection standpoint in tubes of the character described.

In many cases the distortion of the scanned raster may be sufficiently corrected by means of the electromagnetic deflection yoke previously described. However, not all of this type of distortion is completely corrected in every case. In tubes having relatively large angles of deflection, there is good possibility that some objectionable pin-cushion distortion of the horizontal lines will remain. In the case of a multicolor kinescope of the type having a line phosphor screen such as the screen 12 of Figures 1 and 4, it is desirable to effect a higher degree of correction. Furthermore, it is desirable to be able to control the applied correction at least to some extent during operation.

This may be done in accordance with the present invention by providing for cooperation with a deflection yoke of the type described, and an electron-optical lens mounted inside of the tube envelope. One form of such a lens is shown in Figure 1. It comprises two annular electrodes spaced from one another in a region between the deflecting yoke and the luminescent screen. A convenient form of such electrodes is a conducting wall coating on the inner wall of the tube envelope. In this case, one of the annular electrodes is formed by a wall coating 39 which extends from a region between the electron gun 13 and the horizontal deflection yoke 14 to a region between the vertical deflecting yoke 15 and the screen 12. The second annular electrode of the lens also consists of a wall coating 41 spaced somewhat from the electrode 39 and extending from the region between the vertical deflecting yoke and the luminescent screen to the immediate vicinity of the screen.

The first lens electrode 39 is connected to a point on a voltage divider 42 which is connected to the terminals of a power supply represented by the battery 43. By this means the electrode 39 is operated at a potential of considerable magnitude and of positive polarity relative to the potential impressed upon the electron gun 13. The second lens electrode 41 is connected to a more positive point on the voltage divider 42. Also, in this form of the invention, the luminescent screen which is required in this instant to be metallized, is connected to the second lens electrode 41.

The effect of the electron-optical lens formed between electrodes 39 and 41 is to provide a readily controllable refinement of the correction of the pin-cushion distortion to which the scanned raster may be subject. By suitably proportioning the potentials impressed respectively upon the electrodes 39 and 41, any vestiges of pin-cushion distortion remaining after the correction effected by the deflection yoke may be substantially completely removed. The relative values of the potentials impressed upon the electrodes 39 and 41, for example, may be varied by suitable adjustment of one or both of the sliding contacts associated respectively with the electrodes 39 and 41.

The form of the invention shown in Figures 1, 2, and 3 somewhat limits the angle of horizontal deflection. This is caused by reason of the fact that the vertical deflection yoke 15 does not extend beyond the neck portion of the kinescope 11. In this connection it is to be understood that the arrangement of the horizontal deflection yoke 14 of Figure 1 relative to the junction point between the neck and cone sections of the tube is merely diagrammatic. The reason for this is that, for the purpose of illustrating the invention, the apparatus has not been drawn exactly to scale. Accordingly, it will be understood that, in actual practice, the horizontal deflection yoke will be mounted, in this form of the invention, close enough to the cone section of the tube to allow for any desired angle of electron beam deflection.

In order to improve the deflection system in this respect as well as others, another embodiment of the invention shown in Figures 6, 7, 8 and 9 has been devised. In this form of the invention the horizontal deflection yoke 44 is located closer to the conical section of the kinescope 11. This is accomplished by the provision in the vertical deflection yoke 45 of means for locating it at least in part upon the conical section of the tube. This feature will be described presently.

The horizontal deflection yoke comprises a magnetic core 46 which is provided with salient pole pieces 47 and 48. It is to be noted that the faces of these pole pieces are shaped somewhat similarly to the faces of the vertical pole pieces 24 and 25 of Figure 3. By such means, there is provided a horizontal deflecting field having a non-uniform instantaneous intensity. By suitably shaping the faces of the pole pieces 47 and 48, the horizontal deflecting field may be given a distribution to overcome substantially any vertical distortion of the raster scanned at the luminescent screen 12.

The vertical deflection yoke 45 also comprises a magnetic core 49 having salient pole pieces 51 and 52. As viewed in Figure 8, the faces of the pole pieces 51 and 52 are shaped to provide a non-uniform vertical deflecting field. As in the other embodiment of the invention, the intensity of the field is greater at its extremities than in its central region. The gradation in field intensity from the center in both directions outwardly is in accordance with a non-linear function in this case. It has been found that a somewhat improved pin-cushion distortion correction may be effected by this means.

Furthermore, the pole pieces 51 and 52 are beveled substantially as shown in Figure 9. This enables the vertical deflection yoke 45 to be moved forwardly onto the conical section of the kinescope 11.

By means of the structure shown in Figures 6, 7 and 8, it has been possible to produce a scanned raster at the luminescent screen 12 having a substantially rectangular form as indicated at 53 in Figure 10. As indicated, there may still be present some slight amount of vertical barrel distortion. In most cases its effect has been found to be negligible.

The form of the invention shown in Figures 6, 7 and 8 also may beneficially employ an electron-optical lens for providing a fine control of the raster shape. Such a system is indicated in Figure 6. It is substantially similar to that shown in Figure 1. The chief point of difference is that the luminescent screen 12 is connected to a point on the voltage divider 42 which is of higher positive potential than the point to which the electrodes 39 and 41 are connected. It has been found in practice that such an arrangement produces slightly improved results in certain cases.

It may be seen from a consideration of the foregoing disclosure of several illustrative embodiments of the invention that there is provided an improved electron beam deflection system which is capable of producing a high degree of electron beam deflection linearity. One of the components of this system is a yoke having salient pole pieces shaped to correct for pin-cushion distortion. Also, where it is necessary to scan a substantially rectangular raster upon a flat target electrode, such as provided in certain types of color kinescopes, the improved system may include, in addition to such a deflection yoke, an electron-optical system by which to control the beam additionally after its deflection.

It also will be evident, in view of the foregoing disclosure, that the system in accordance with the present invention provides an arrangement whereby control of the raster shape may be effected readily while the apparatus is in operation. The electron-optical lens performs this function to a degree determined in part by the relative potentials impressed upon the components thereof. As shown in Figure 1, a single lens is used. This is produced in the region between the annular electrodes 39 and 41. It also will be observed that in Figure 6 two lenses are formed. They comprise the one produced in the region between the electrodes 39 and 41 and the one formed in the region between the annular electrode 41 and the screen 12.

Accordingly, it is contemplated to be within the scope of the present invention that the electron-optical system may consist of one or a number of lenses. Also, one or more adjusting facilities may be provided as desired to produce particular effects. Another form in which the electron-optical lens may be embodied is a logical extension of the foregoing disclosure. In such a form, the wall coating of the tube would be provided as a single electrode unit as in the conventional tubes. The lens would then be formed between the end of the wall coating adjacent to the luminescent screen, as indicated generally in the form of the invention shown in Figure 6. In such a case the impression of different potentials upon the wall coating and upon the screen, respectively, would produce the desired electron-optical effect. Similarly, other logical extensions of the illustratively disclosed forms of an electron-optical device are considered to fall within the scope of the invention.

The nature of the invention may be ascertained from the foregoing illustrative embodiments thereof. The scope of the invention is set forth in the appended claims.

What is claimed is:

1. In apparatus for reproducing a color television image, a multicolor kinescope having substantially flat luminescent screen provided with a multiplicity of phosphor strips capable respectively of emitting light of the component image colors, means for developing and directing an electron beam toward said screen to selectively excite said phosphor strips, a yoke for deflecting said electron beam to scan a raster at said screen, said yoke comprising horizontal and vertical magnetic cores mounted adjacent to the path of said beam, each of said cores having salient pole pieces provided with faces shaped suitably to produce a field of non-uniform intensity, whereby to control said beam deflection in a manner to scan a raster approximately of predetermined shape at said screen, and an electron-optical lens located between said deflecting yoke and said screen to accurately control the shape of the raster scanned at said screen.

2. Color television image-reproducing apparatus as defined in claim 1 wherein, said electron-optical lens is an electrostatic system mounted inside of the tube envelope, said pole face shaping being of a character to produce respective beam deflecting fields each of which having substantially the same intensity at both ends of the gap defined by said pole faces and a different intensity substantially at the center of said gap.

3. Color television image-reproducing apparatus as defined in claim 1 wherein, said electron-optical lens comprises two spaced annular electrodes disposed adjacent to the paths of the deflected electron beam, and means for operating said annular electrodes at different positive potentials relative to said electron beam-developing means, said shaped pole faces of each of said cores defining a deflecting field gap which is wider at its center than at its ends.

4. Color television image-reproducing apparatus as defined in claim 1 wherein, said electron-optical lens comprises metallic wall coatings formed on the inner surface of the tube envelope and connected to two different points of positive potentials relative to said electron beam-developing means, said shaped pole faces of each of said cores defining a deflecting field gap which has maximum width substantially at its center and decreases substantially linearly in both directions to minimum widths at its ends.

5. Color television image-reproducing apparatus as defined in claim 1 wherein, said electron-optical lens comprises a first annular electrode disposed adjacent to the tube envelope and extending from a region located between said electron beam-developing means and said deflecting yoke to a region between said deflecting yoke and said screen and operated at a predetermined positive potential relative to said beam-developing means, and a second annular electrode electrically separate from said first electrode extending from said region between said deflecting yoke and said screen to a region in the vicinity of said screen and also operated at a positive potential relative to said beam-developing means but of greater magnitude than said predetermined potential, said shaped pole faces of each of said cores defining a deflecting field gap which has maximum width substantially at its center and decreases non-linearly in both directions to minimum widths at its ends.

6. Color television image-reproducing apparatus as defined in claim 1 wherein, said luminescent screen being metallized, said electron-optical lens comprises a first annular electrode extending from the vicinity of said deflecting yoke to a region between said yoke and said screen and a second annular electrode extending from said region between said deflecting yoke and said screen to the vicinity of said screen, said first electrode being maintained at a first positive potential relative to said beam-developing means, and said second electrode and said metallized screen both being maintained at the same higher positive potential relative to said beam-developing means.

7. Color television image-reproducing apparatus as defined in claim 1 wherein, said luminescent screen has a transparent metallic film, said electron-optical lens comprises an annular electrode extending from the vicinity of said deflecting yoke to a region between said yoke and said screen and a second annular electrode extending from said region between said deflecting yoke and said screen to the vicinity of said screen, said first electrode being maintained at a first positive potential relative to said beam-developing means, said second electrode being maintained at a somewhat higher positive potential, and said metallized screen being maintained at an even higher positive potential.

ALBERT W. FRIEND.
FREDERICK H. NICOLL.

REFERENCES CITED

The following references are of record in the file of this patent:

UNITED STATES PATENTS

| Number | Name | Date |
|---|---|---|
| 2,077,270 | Schlesinger | Apr. 13, 1937 |
| 2,185,138 | Shanns-Heinz Wolff | Dec. 26, 1939 |
| 2,227,711 | Gunther | Jan. 7, 1941 |
| 2,259,233 | Tingley | Oct. 14, 1941 |
| 2,264,274 | Broadway | Dec. 2, 1941 |
| 2,297,407 | Gunther | Sept. 29, 1942 |
| 2,307,188 | Bedford | Jan. 5, 1943 |
| 2,409,514 | Pratt | Oct. 15, 1946 |
| 2,425,125 | Richards | Aug. 5, 1947 |
| 2,438,668 | Koch et al. | Mar. 30, 1948 |
| 2,446,248 | Shrader | Aug. 3, 1948 |
| 2,461,515 | Bronwell | Feb. 15, 1949 |